Oct. 27, 1953

G. E. GAREY 2,656,660

FLEXIBLE HARROW HITCH

Filed Feb. 15, 1949

INVENTOR,
George E. Garey.
BY
Roy E. Hamilton,
Attorney.

Patented Oct. 27, 1953

2,656,660

UNITED STATES PATENT OFFICE 2,656,660

FLEXIBLE HARROW HITCH

George E. Garey, Downs, Kans.

Application February 15, 1949, Serial No. 76,449

2 Claims. (Cl. 55—84)

This invention relates to new and useful improvements in harrow hitches, and has as its principal object the provision of a harrow hitch including a sectional draw bar with its sections so connected as to permit the harrow sections drawn thereby to follow the contour of rough or uneven ground, thereby obtaining more efficient working of the ground and removing strain from the draw bar.

Another object is the provision of a harrow hitch including a draw bar having a plurality of sections hingeably connected for relative pivotal movement in a vertical plane, and draft members so connected to said draw bar to maintain said draw bar in line in a vertical plane and to remove transverse stresses from said hinge connections.

A further object is the provision of a harrow hitch comprising a plurality of separable sections normally held in assembled relation by the pulling force exerted thereon, and which may easily and quickly be disassembled and packed in a minimum of space for convenience of storage and shipping.

A still further object is the provision of a harrow hitch comprising a plurality of hinged sections adapted to be folded on themselves whereby to pass easily through narrow gates and the like.

Other objects are simplicity and economy of construction, ruggedness and dependability of operation, and adaptability to be used with various types of ground working tools.

With these objects in view, as well as other objects which will appear in the course of the specification, reference will be had to the drawing, wherein.

Figure 1:
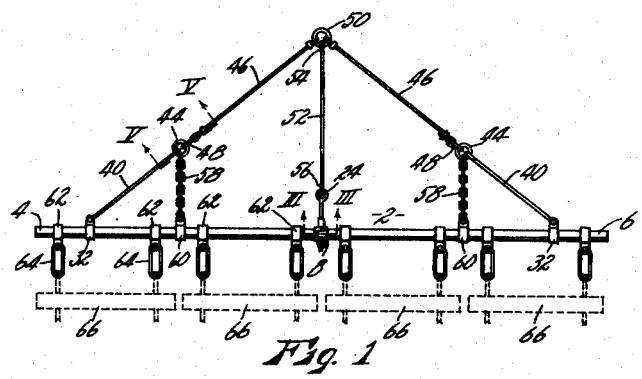
Figure 1 is a plan view of a two-section harrow hitch embodying the present invention, showing portions of harrow sections attached thereto in dotted lines.
Figure 3:
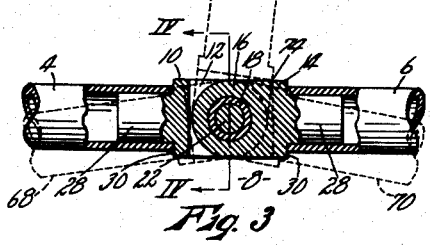
Fig. 3 is an enlarged fragmentary section taken on line III—III of Fig. 1, showing a pair of draw bar sections in alignment in solid lines, in a relatively angled position such as normally occurs in operation in dotted lines, and in the position assumed when the hitch is folded to pass through a gate in dotted lines.
Figure 4:
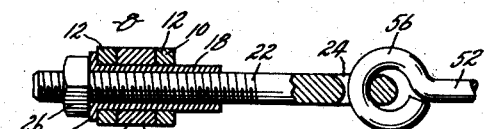
Fig. 4 is a fragmentary section taken on line IV—IV of Fig. 3.
Figure 5:
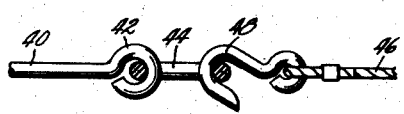
Fig. 5 is an enlarged fragmentary section taken on line V—V of Fig. 1.

Like reference numerals apply to similar parts throughout the several views, and in Fig. 1 the numeral 2 applies to a draw bar comprising two like sections 4 and 6 made of a suitable tubular material such as heavy steel pipe and joined at their adjacent ends by a hinge connection 8. As best shown in Figs. 3 and 4, said hinge connection comprises a bifurcated member 10 having spaced apart arms 12, a tongued member 14, the tongue 16 of which extends between arms 12, and a sleeve 18 which extends horizontally through arms 12 and tongue 16 to connect the hinge members for pivotal movement in a vertical plane. Said sleeve is provided with a flange 20 which abuts against the rearward surface of the hinge. An adjusting bolt 22 extends through sleeve 18, being formed at its forwardly extended end to present an eye 24, and carrying a nut 26 on its rearward portion adapted to abut against flange 20 of sleeve 18. Hinge members 10 and 14 are each provided with an outwardly projecting stub 28 adapted to fit snugly and slidably into the adjacent end portions of draw bar sections 4 and 6, and are also formed to present shoulders 30 against which said draw bar sections abut.

Figure 7:
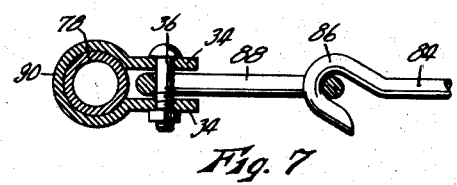
Fig. 7 is an enlarged fragmentary section taken on line VII—VII of Fig. 2.
Figure 6:
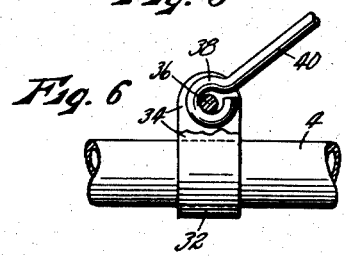
Fig. 6 is an enlarged plan view of a draw bar clamp and a section of the draw bar, partially broken away.

A C-clamp 32 is carried by each draw bar section adjacent the outer end thereof, said clamp having outwardly projecting spaced apart arms 34 connected by a clamp bolt 36, as best shown in Figs. 6 and 7. Loosely mounted on each of said bolts is the eye 38 of a rod 40 which extends forwardly and inwardly and which is formed at its inner end to present an eye 42 engaging a ring 44. A cable 46 is detachably connected to each of rings 44 by a hook 48. Said cables extend forwardly and inwardly and are both fixed to a ring 50 to which a tractor or other pulling vehicle, not shown, may be hitched. A rod 52 is formed at its forward end to present an eye 54 for engaging ring 50, and at its rearward end to present an eye 56 for engaging eye 24 of adjusting bolt 22.

A chain 58 is connected at its forward end to each of rings 44, and at its rearward end to C-clamp 60 carried by the associated draw bar section. A plurality of C-clamps 62 are distributed along the draw bar sections 4 and 6, and each of said clamps carries a loosely connected link 64 to which harrow sections 66, shown fragmentarily in dotted lines, may be connected. All of C-clamps 32, 60 and 62 are substantially identical, and may be slidably adjusted along the associated draw bar sections simply by loosening clamp screw 36 thereof. It will be noted that the use of C-clamps in this manner removes the necessity of drilling holes in the draw bar or otherwise weakening it.

In operation, the tension in draft members 46 and 40 exerts an inward force on draw bar sections 4 and 6 which keeps them firmly engaged on studs 28 of hinge connection 8, thereby making a rigid or locked connection unnecessary. The draw bar sections are free to pivot relatively in a vertical plane, thereby permitting the harrow sections 66 to follow the contour of rough or uneven ground. Rod 52, which is connected directly to the main pulling ring 50 and to adjusting bolt 22 which passes through the pivot of hinge 8, provides lateral support for said hinge. By turning nut 26 of said adjusting bolt, the draw bar sections may be maintained in alignment in a vertical plane. Chains 58 provide support for the draw bar sections at intermediate points. The hitch may be quickly and easily disassembled by disengaging hooks 48 from rings 44 and sliding the draw bar sections 4 and 6 off of stubs 28 of the hinge connection 8. Cables 46 may then be folded against rod 52 and rods 40 folded against their associated draw bar sections, and the entire hitch packed in a minimum of space for storage or shipment. It should also be noted that the hitch may be inverted in case one side should become worn by contact with the ground, without in any way affecting its usefulness. In Fig. 3, the numerals 68 and 70 show the draw bar sections 4 and 6 dotted in representative positions assumed during the normal pivoting thereof, and numeral 72 shows section 4 folded upwardly and over section 6 to adapt the harrow to be drawn through a narrow gate or the like. When in this position hinge members 10 and 14 abut at point 74.

Figure 2:
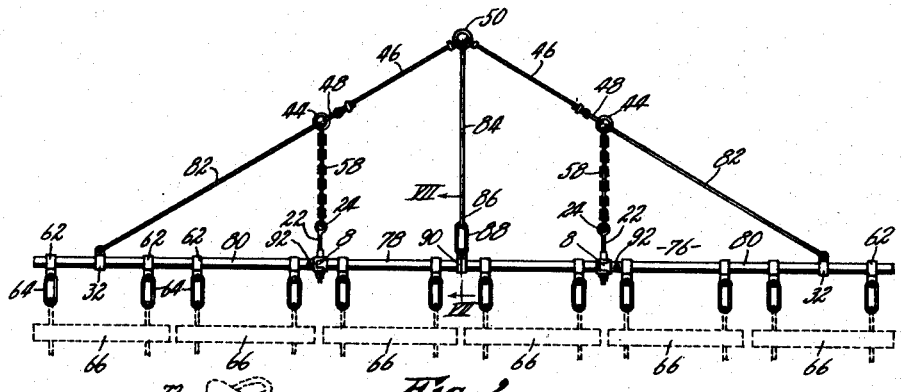
Fig. 2 is a view similar to Fig. 1, but showing a three-section harrow hitch.

Fig. 2 shows a three-section hitch incorporating this invention. The draw bar 76 thereof comprises a central section 78 and two end sections 80 hingeably connected thereto by hinge connections 8. Rods 82, which correspond to rods 40 of the two-section hitch, are sufficiently long that their forward ends are disposed substantially directly forward from the hinge connections 8, and chains 58 are connected directly to eyes 24 of adjusting bolts 22 of said hinge connections. Rod 84, which corresponds to rod 52 of the two-section hitch is formed at its rearward end to present a hook 86 adapted to engage detachably a link 88 loosely secured to the middle point of central draw bar section 78 by means of a C-clamp 90 identical with clamps 32, 60, and 62. The construction and operation of the three-section hitch is otherwise similar to that of the two-section hitch. If desired, hinge connections 8 may be secured to end draw bar sections 80 by pins 92 inserted through said draw bar sections and through the associated stubs 28 of the hinge connections. Draft rod 52 of the two-section hitch, and draft chains 58 of the three-section hitch, have the additional function of maintaining the hinge joints 8 substantially horizontal by preventing their rotation within the tubular draw bar sections.

While I have disclosed specific embodiments of my invention, it is apparent that many slight variations of construction and operation could be made without departing from the spirit of the invention.

What I claim is:

1. A harrow hitch comprising a draw bar having a plurality of tubular sections, hinge joints for connecting said draw bar sections for relative pivotal movement in a vertical plane, each of said hinge joints comprising a pair of hinge members pivotally connected on a horizontal axis and having oppositely extending stub portions adapted to be engaged slidably in the adjacent end portions of the associated draw bar sections, and draft members connected respectively adjacent the ends of said draw bar and angled forwardly and inwardly, whereby the tension of said draft members will create a compressive load in said draw bar for holding the sections thereof in assembled relation on said hinge joints.

2. A harrow hitch comprising a draw bar having a plurality of tubular sections, hinge joints for connecting said draw bar sections for relative pivotal movement in a vertical plane, each of said hinge joints comprising a pair of hinge members pivotally connected by a horizontal sleeve extending therethrough and having oppositely extending stub portions adapted to be engaged slidably in the adjacent end portions of the associated draw bar sections, a forwardly extended bolt extending through each of said pivot sleeves, first draft members connected respectively adjacent the outer ends of said draw bar and angled forwardly and inwardly whereby the tension of said draft members creates a compressive load in said draw bar to maintain the sections thereof in assembled relation with said hinge joints, and second draft members each connected at its rearward end with one of said bolts and at its forward end with said first draft members, whereby said hinge joints are prevented from rotating in said tubular draw bar sections.

GEORGE E. GAREY.

References Cited in the file of this patent

UNITED STATES PATENTS

| Number | Name | Date |
| --- | --- | --- |
| 1,251,883 | Hair | Jan. 1, 1918 |
| 1,430,825 | Mason et al. | Oct. 3, 1922 |
| 1,435,107 | Cox | Nov. 7, 1922 |
| 1,805,409 | Mason et al. | May 12, 1931 |
| 1,843,381 | Brainard | Feb. 2, 1932 |
| 2,131,667 | Noble | Sept. 27, 1938 |
| 2,263,968 | Gross | Nov. 25, 1941 |
| 2,319,755 | Strandlund | May 18, 1943 |
| 2,486,483 | Laden | Nov. 1, 1949 |